United States Patent [19]

Fujita

[11] 3,795,831

[45] Mar. 5, 1974

[54] MINIATURE TUNING FORK TYPE CRYSTAL VIBRATOR

[75] Inventor: Kinji Fujita, Shimosuwa-Machi, Japan

[73] Assignee: Kabushiki Kaisha Suwa Seikosha, Tokyo, Japan

[22] Filed: Apr. 26, 1972

[21] Appl. No.: 247,389

Related U.S. Application Data

[63] Continuation of Ser. No. 75,029, Sept. 24, 1970, abandoned.

[30] Foreign Application Priority Data

Oct. 3, 1969 Japan ............................... 44-78866

[52] U.S. Cl. ................. 310/9.4, 58/23 TF, 310/8.2, 310/25

[51] Int. Cl. ............................................ H04r 17/00

[58] Field of Search ......... 310/8.2, 8.5, 25, 8.6, 9.4, 310/9.1, 21, 26, 9.6; 58/23 TF

[56] References Cited

UNITED STATES PATENTS

| | | | |
|---|---|---|---|
| 2,081,405 | 5/1937 | Mason | 310/9.1 X |
| 3,579,975 | 5/1971 | Besson et al. | 310/25 X |
| 3,581,130 | 5/1971 | Grib | 310/25 X |
| 3,577,020 | 5/1971 | Carlson | 310/8.2 |
| 3,559,100 | 1/1971 | Grib et al. | 310/25 X |
| 3,683,213 | 8/1972 | Staudte | 310/8.2 X |
| 3,697,766 | 10/1972 | Ganter et al. | 310/8.5 |
| 3,518,470 | 1/1970 | Lungo | 310/9.1 X |
| 3,423,700 | 1/1969 | Curran et al. | 310/9.1 X |
| 3,678,309 | 7/1972 | Choffat | 310/9.6 |

*Primary Examiner*—Gerald Goldberg
*Assistant Examiner*—Mark O. Budd
*Attorney, Agent, or Firm*—Blum, Moscovitz, Friedman & Kaplan

[57] ABSTRACT

A crystal vibrator having a tuning fork type vibrator supported by a pair of flexible supporting wires, each of said wires being fixed at one end to opposed sides of said vibrator along the symmetrical axis thereof. The other end of each of said supporting wires is rigidly fixed, with the portion in between extending substantially parallel to said vibrator, said supporting wire being dimensioned and positioned so that the center of rotation on said wire is substantially aligned with the center of gravity of said vibrator when said vibrator is subjected to external shock.

4 Claims, 8 Drawing Figures

MINIATURE TUNING FORK TYPE CRYSTAL VIBRATOR

This is a continuation of application Ser. No. 75,029, filed Sept. 24, 1970 now abandoned.

DETAILED DESCRIPTION OF THE INVENTION

Our invention relates to a specially miniaturized tuning fork type crystal vibrator, wherein the frequency of the vibrator is maintained constant and the Q value of the vibrator is large. Our invention more particularly relates to a crystal vibrator whose frequency remains even if a great external shock is applied to the vibrator, as in the case of being dropped onto the floor. The invention relates to an improved supporting method of the vibrator, and to the provision of a shock absorber in the proper position around the vibrator.

The object of our invention is to provide a stable crystal vibrator having a supporting device and absorber and being stable when subjected to external shock. The other object of our invention is to provide a particularly high precision watch by employing a miniaturized stable vibrator incorporating a crystal vibrator of high Q value.

Generally in miniaturizing a crystal vibrator, it is difficult to miniaturize the dimensions of the supporter and the connecting area in proportion to the vibrator. Although it is easy to miniatrize the vibrator, skilled technique is necessary to miniaturize its surrounding parts. The supporting wire of the vibrator should be made as thin as possible, in order to decrease the loss energy of the vibrator. On the other hand, it is not good to make the supporter of too thin and weak material, because it is necessary to keep the oscillator stable and the central frequency unchangeable even if the oscillator is subjected to external shock, i. e. when it is dropped onto the floor by accident during ordinary wear. In general, when the vibrator is dropped onto the floor, it is crashed against the surrounding wall of the vacuum case and the crystal is broken. The device of our invention protects against such a great shock by incorporating particular absorbing and supporting devices, so that the frequency of the miniaturized vibrator remains constant.

The supporting device according to our invention, is constructed in such a manner that the tuning fork is supported at the two points on symmetry axis at is the root portion of the tuning fork crystal vibrator but apart from the root portion of tines of the tuning fork, and is also characterized by the fact that the center of gravity of the vibrator coincides with the axis of rotation of the vibrator. The supporting device of our invention is also characterized by the fact that the displacement of the vibrator is minimized so that the Q value of the vibrator is not decreased due to miniaturizing. Further, the device is characterized by the fact that the vibrator is free from impacting against the adjacent case wall.

BRIEF DESCRIPTION OF THE DRAWINGS

FIG. 3 illustrates the supporting part of our tuning fork type crystal vibrator.

FIG. 1 shows a cross sectional view of the construction of the prior tuning fork type crystal vibrator unit in which 1 is a tuning fork type crystal vibrator, 2 is a contact point of the vibrator sintered with silver, 3 is a supporting spring made of phosphor bronze, and 4 is the mica plate protecting the vibrating body. As shown in the figure, said vibrator is supported at two contact points from both sides by the spring 3. However, the contact point is not in perfect static condition and much stress occurs at said points. Accordingly when so many supporting points are used, there is much loss in the supports and miniaturizing substantially decreases the Q value. For this reason, it is almost impossible to apply the arrangement of FIG. 1 to practical use.

FIG. 2 shows the tuning fork type crystal vibrator according to our invention. 5 is a tuning fork type crystal vibrator, 6 is a supporting spring, and 7 are high stiffness supporters which also serve as two electrode leads. 8 is a lead wire which defines the third electrode. 9 is an insulating stem, the periphery of which is surrounded by metal. As shown in the figure, the tuning fork type crystal vibrator of our invention is supported at two points from both sides, which points are on the symmetry axis of the root of the tuning fork.

As shown in FIG. 3A, the supporting points 10 are apart from the root portion of the tine of the vibrator, that is to say, is positioned at a point which is spaced a distance ($a$) three to six times as long as the width ($d$) of the tine in a region away from the arm root. When the supporting points are so positioned the internal stress is very small and the loss due to supporting the vibrator at these points is minute. Therefore, if the vibrator is miniaturized enough for application to a wrist watch, the Q value does not decrease substantial, so a very excellent stable miniature vibrator can be obtained. And as shown in FIG. 3-*b*, the tip of the supporting spring is inserted into the guide hole 12 and is fixed by solder, so even if a shock is applied to the supporting spring, it remains fixed in its position.

FIG. 5 shows the relationship between the fixing position ($a$) of the tuning fork and the Q value of the crystal vibrator. When the distance ($a$) is at least three times as long as the width ($d$) in the vibrating direction of the tuning fork, the Q value is substantially maximized. In FIG. 3, arrow V refers to the vibrating direction of the tuning fork.

The supporting device of our invention is characterized by the fact that the center of gravity of the vibrator coincides with the axis of rotation when the shock is applied from the outside. Therefore, when the shock from outside is applied as linear force, external torque is not applied to the vibrator and displacement becomes 0, but when the shock is applied as rotating force, the vibrator is rotated by the moment of inertia. In FIG. 3, the equivalent spring constant is K around axis M of rotation. If the acceleration due to external shock is applied to the vibrator 13 and the axis of rotation of the vibrator is M, the value $t$ of displacement at the head of the vibrator 13 is shown in the following equation.

$$t = l\ddot{\theta}/4\pi^2 f^2$$

In above equation, $f$ is the resonance frequency of the supporting spring 11, and $l$ is the distance between the axis M and the head of the vibrator. For instance, the case of vibrator which is used for a wrist watch, if $l$ is 1 cm, $f$ is 100 Hz and $\ddot{\theta}$ is $20\pi/(1/100)$ rad/sec$^2$, $t$ is 0.16mm. Accordingly, it is obvious that the value of displacement due to the external shock is very small during ordinary wearing time.

In above mentioned supporting device according to our invention, the center of gravity of the tuning fork coincides with the axis of rotation, so that the displacement of the vibrator becomes near zero when an external linear shock is applied to the body, and the rotational displacement becomes near zero when a rotary external shock is applied to the vibrator. In addition, the vibrator scarcely touches the neighboring wall during such shock.

Figure 4:
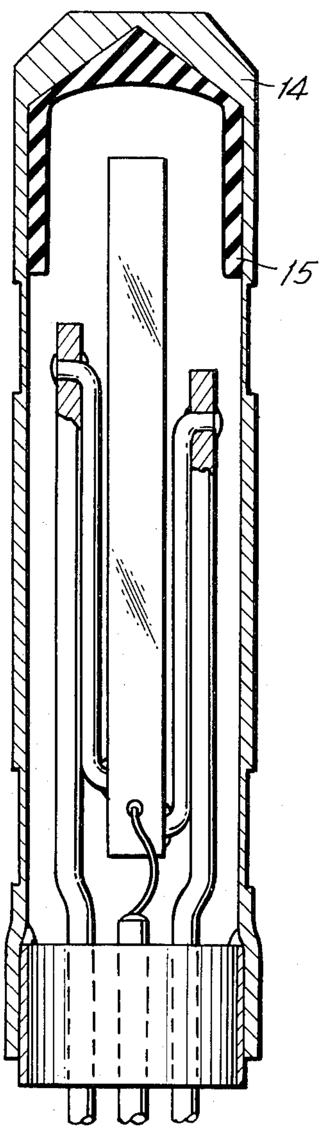
FIG. 4 illustrates the case for tuning fork type crystal according to our invention.
Figure 5:
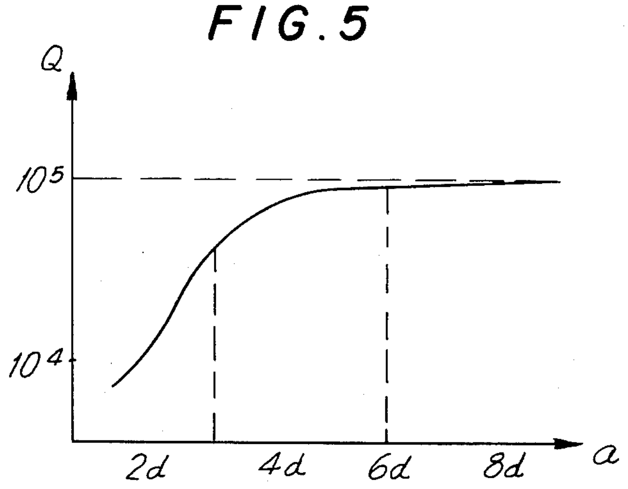
FIG. 5 shows the relationship between the Q value of the vibrator and the fixing position.

FIG. 4 shows a sectional view of the tuning fork type crystal vibrator according to our invention. 14 is a metal vacuum case, for eliminating damping loss of the vibrator. 15 is an internal cap formed of silicon rubber or such other resilient film having a low steam pressure. Said internal cap is bound to the inner surface of the metal case. Therefore, when extraordinary shock which cannot be absorbed by the supporting device as above described is applied, internal cap 15 is useful to prevent the head of the tines of the vibrator from crashing directly against the metal case.

Figure 1A:
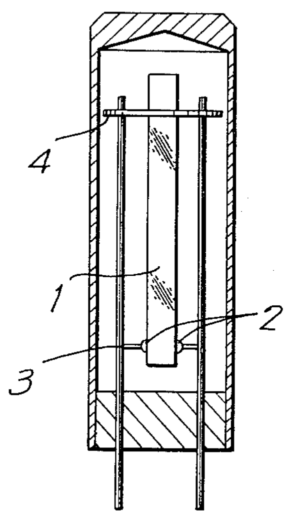
FIG. 1 shows the structure of a prior tuning fork type crystal vibrator.
Figure 1B:
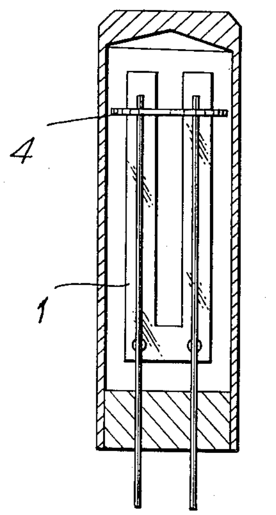
Figure 1C:
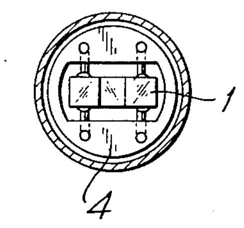
Figure 2:
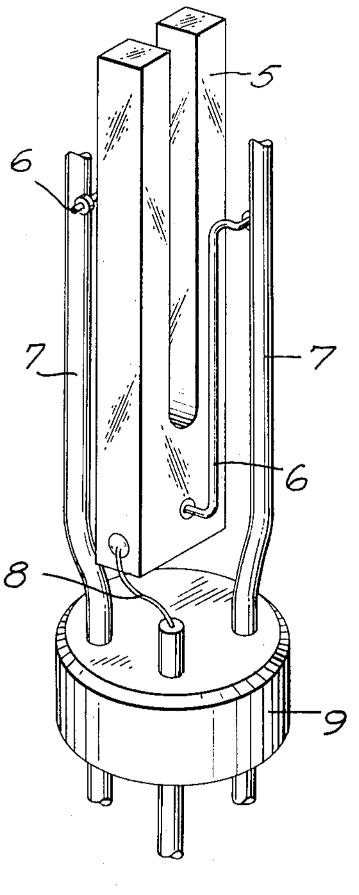
FIG. 2 shows the structure of the tuning fork type crystal vibrator according to our invention.
Figures 3A, 3B:
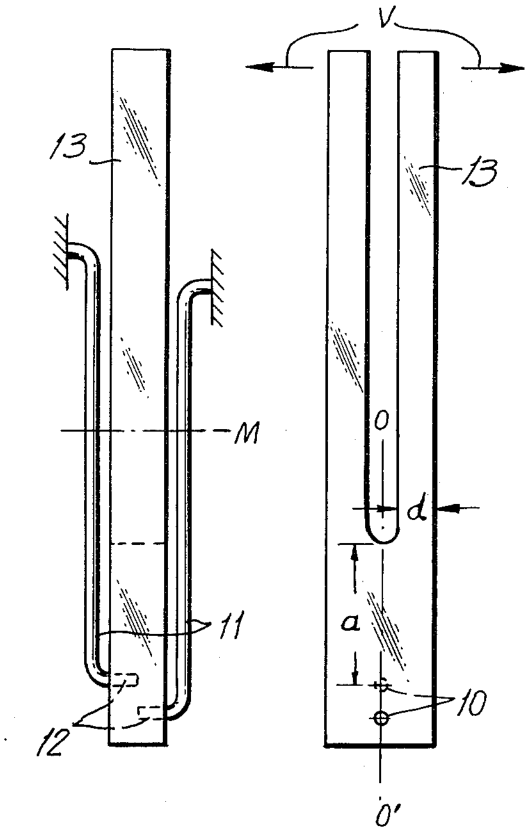
FIGS. 3*a* and 3*b* which illustrate FIG. 3 are the rough sketches which indicate the shock - proof characteristics of the crystal vibrator.

Protecting mica plate 4, shown in FIG. 1 is not sufficient as the absorber and it is very difficult to produce a plate 4 made from rubber. The absorbing device made of rubber according to our invention is simple in its structure, easy to be miniaturized and is very effective in protecting the oscillating unit.

As explained in detail, the supporting device and the absorbing device of the tuning fork crystal vibrator according to our invention makes it possible to provide a portable miniature stable crystal vibrator as the time standard and makes it possible to apply it to a high precision watch.

What is claimed is:

1. A crystal vibrator comprising a tuning fork crystal vibrator having a pair of tines and a root portion, said vibrator having two substantially "U" shaped parallel faces; a support member comprising two flexible support wires; one wire connected at one of its ends to the root portion of one of the U shaped faces, extending perpendicular to said plane, then bent toward the tine portions so as to extend parallel to said face; the second end of said support wire being fixedly supported, the second support wire being similarly attached to the second U shaped plane of the crystal; said support wires being positioned and dimensioned so that the points of contact between said support wires and said vibrator root portion lie substantially on the symmetrical axis of said vibrator, said supporting wires being further dimensioned and positioned so that the center of rotation of said vibrator in response to an external shock corresponds to the center of gravity of said vibrator and is located in the region of said tines.

2. A crystal vibrator as recited in claim 1 wherein the points of contact between said ends of said supporting wires and said vibrator root portion are positioned so that the distance between each said point of contact and the end of said tines adjacent said vibrator root portion is equal to about 3 to 6 times the width of one of said tines in a region thereof spaced from said vibrator root portion.

3. A crystal vibrator as recited in claim 1, including a welded case, said crystal vibrator being mounted within said case, and an internal cap member mounted within said case above and about the region of said tines spaced from said root portion, said internal cap member being formed of a resilient material.

4. A crystal vibrator as recited in claim 1, wherein the ends of said supporting wires engage said vibrator root portion at respective points of contact on opposed sides of said vibrator root portion which are out of alignment with each other.

* * * * *